United States Patent [19]

Dill

[11] 4,416,219
[45] Nov. 22, 1983

[54] EGG COLLECTING SYSTEM AND METHOD

[75] Inventor: Terry A. Dill, Keota, Iowa

[73] Assignee: Jefferson Industries Company, Fairfield, Iowa

[21] Appl. No.: 386,114

[22] Filed: Jun. 7, 1982

[51] Int. Cl.³ ............................................. A01K 31/16
[52] U.S. Cl. ..................................... 119/48; 198/435
[58] Field of Search .................. 119/48; 198/369, 435

[56] References Cited

U.S. PATENT DOCUMENTS

| | | | |
|---|---|---|---|
| 2,264,156 | 11/1941 | Apple | 119/48 |
| 2,710,682 | 6/1955 | Coll | 119/48 X |
| 3,101,475 | 8/1963 | Petersen et al. | 198/369 |
| 3,626,905 | 12/1971 | Giesbert et al. | 119/48 |
| 3,672,485 | 6/1972 | Walters | 119/48 |
| 3,789,802 | 2/1974 | Conley | 119/48 |
| 4,159,696 | 7/1979 | Martin | 119/48 |
| 4,226,211 | 10/1980 | Barrentine | 119/48 |

*Primary Examiner*—Hugh R. Chamblee
*Attorney, Agent, or Firm*—Rudolph L. Lowell

[57] ABSTRACT

An automated, tiered, egg collecting system and method for tiered confinement cage rows for poultry in which each row of confinement cages has a cage-row conveyor for delivering eggs to an end of the cage row. Under the teaching of the invention, a vertically movable, horizontally extended transport conveyor is oriented transversely of the cage row conveyors and adjacent the egg-delivery ends thereof for movement up and down to a plurality of pre-selected, egg-receiving positions. The vertically movable conveyor carries a hydraulically operated motor and drive shaft which provides driving power to each of the cage row conveyors only during the period of time when the vertically movable conveyor is in an egg-receiving position with respect to a tier of cage row conveyors. The drive motor is coupled with a drive shaft on a cage row conveyor through coacting mechanical means as a function of the position of the vertically movable conveyor relative to the delivery ends of a tier of row conveyors. The vertically movable conveyor is connected with a stationary horizontal conveyor unit through a telescoping conveyor section.

6 Claims, 6 Drawing Figures

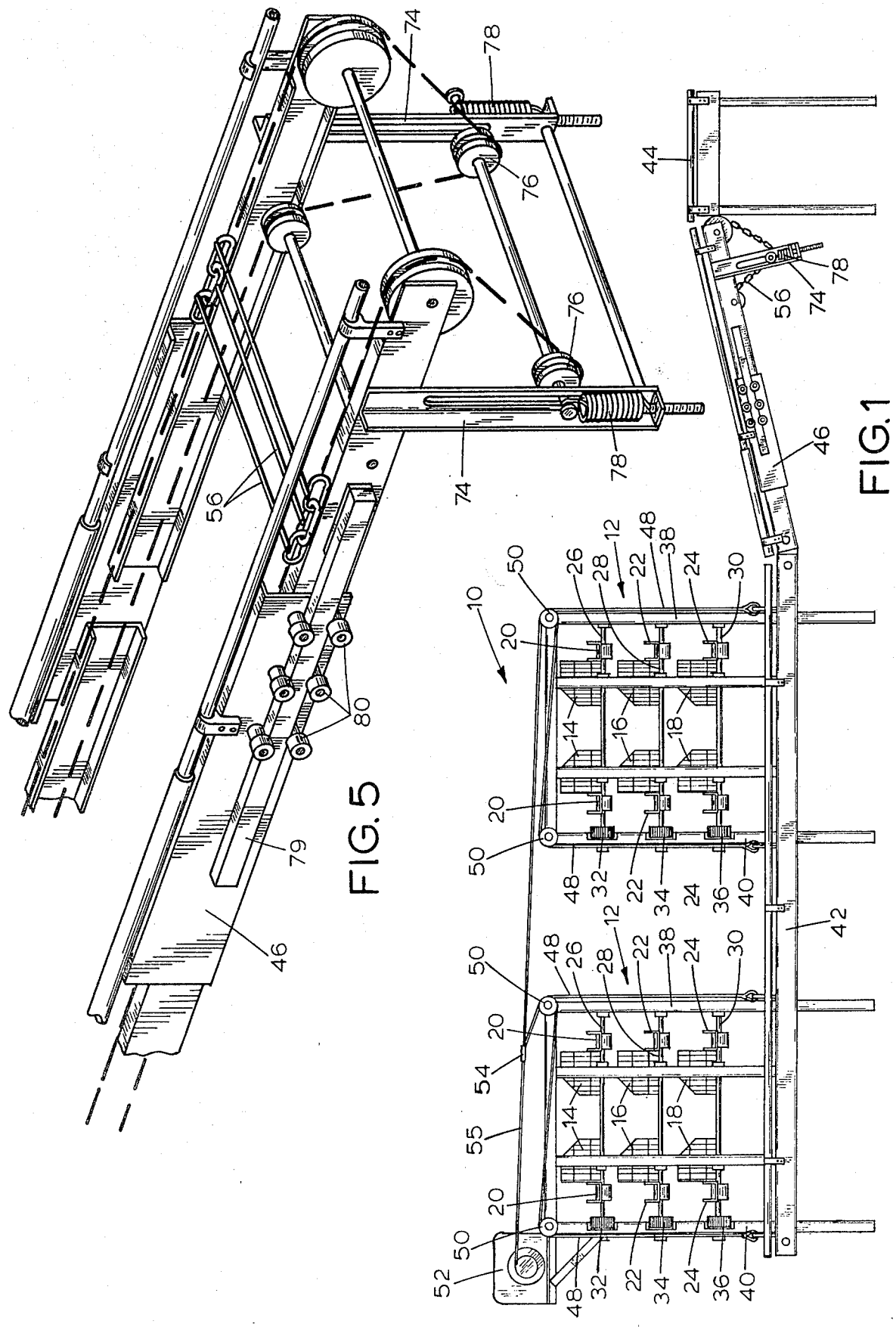

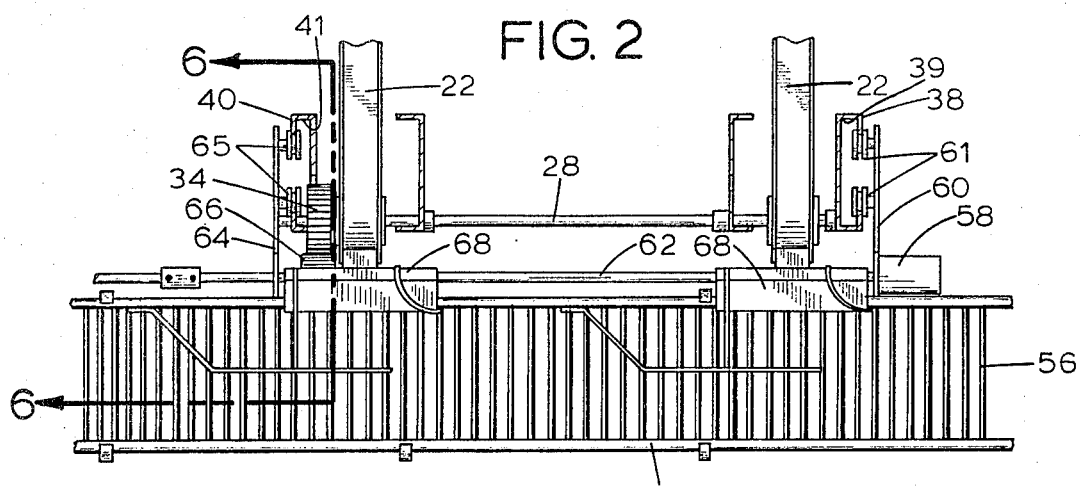
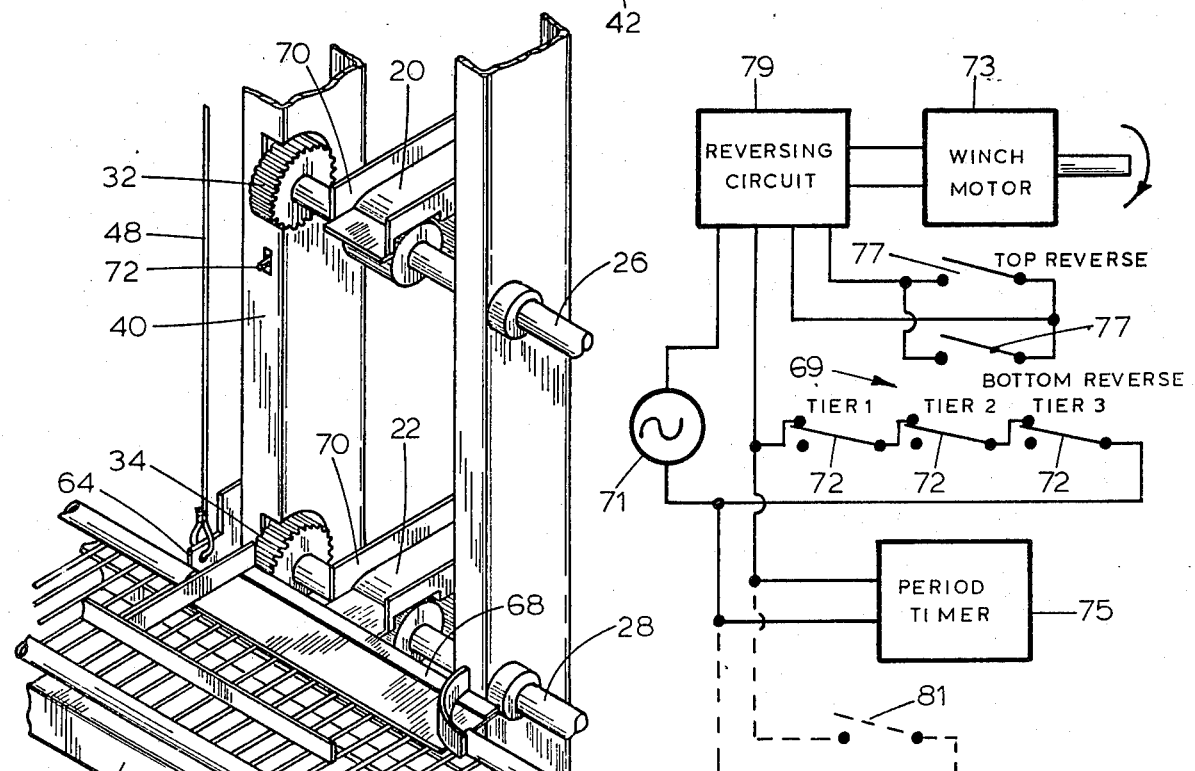
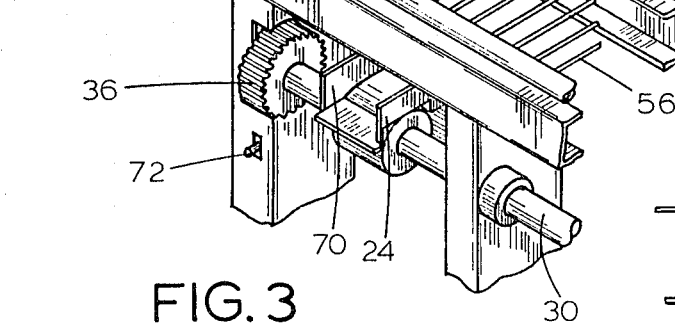
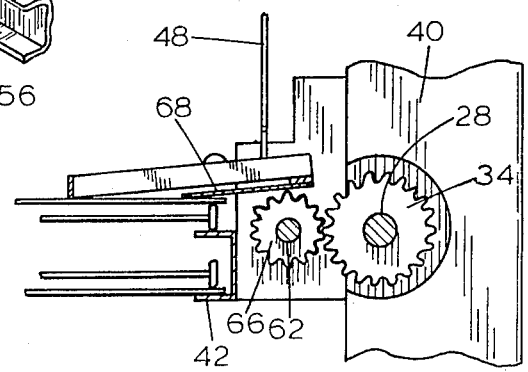

EGG COLLECTING SYSTEM AND METHOD

BACKGROUND OF THE INVENTION

The instant invention relates generally to egg collecting systems, and more specifically, to an egg collecting system for collecting eggs from associated tiered rows of confinement cages for poultry and having the capability of delivering the eggs from multiple levels to a single common egg delivery or transfer conveyor.

Large confinement systems for improving the efficiency of egg producing operations have been known in the prior art for many years. Most of the confinement systems employ cages arrayed side-by-side in cage rows. This configuration facilitates the use of a conveyor belt or other conveying structure extended along the side of each cage row to receive eggs from the individual cages for delivery toward one end of the row. As long as the cage rows are all on relatively the same horizontal plane, no significant problem is presented in terms of safely collecting the eggs delivered to the ends of the cage rows on a single conveyor or transfer system capable of receiving eggs from the several row conveyors in generally the same plane as the transfer conveyor.

A very different problem is posed, however, when the confinement cage rows are vertically tiered in association with row conveyors for delivering eggs to the ends of the rows at different vertical heights. Several developments have attempted to solve this problem through use of a wide variety of vertically oriented egg transporting mechanisms. For example, egg carrying elevators have been used in Walters U.S. Pat. No. 3,672,485, and cupped fingers in Martin U.S. Pat. No. 4,159,696. Other types of cup arrangements are used for generally vertical movement of eggs in Conley, U.S. Pat. No. 3,789,802 and in Glesbert, U.S. Pat. No. 3,626,905. A major problem common to all of the cited systems is their extreme mechanical complexity as well as the associated cost of manufacture and operation of such systems.

All of the cited references show some special attention to the problem of delivery of the egg from a row conveyor to the elevators, fingers, or cups, which are used to vertically transport the egg. In addition, still further difficulty is encountered in unloading or releasing the egg from the vertical conveying cups or fingers. Yet another problem is to deal with a continuous flow of eggs from each row conveyor in a manner in which the vertical transporting system is not overwhelmed by the upper cage-row conveyors to the exclusion of eggs delivered along the lower cage-row conveyors.

Still other systems have employed complex controls and variable speed drive motors for starting and stopping row conveyors together with devices for collecting eggs from a row conveyor during a pre-established period of time. Such a system is advertised by Cycle Systems, Inc. of Le Sueur, Minn.

The present invention solves the problems posed by the cited prior art systems through use of a single horizontal vertically movable main conveyor for selectively receiving eggs from each vertical level of row conveyors. The main conveyor carries a drive motor and associated drive system which causes the respective row conveyors to deliver eggs to the main conveyor only during the time when the main conveyor is in the proper vertical position to receive eggs from the driven conveyors.

SUMMARY OF THE INVENTION

The automated, tiered egg collecting system of the present invention provides a simplified and efficient means for delivering eggs from tiered cage-row egg conveyors to a single egg processing point. Both simplicity and efficiency are derived from the use of the vertically movable, horizontally extended transfer conveyor for receiving eggs from each tier of cage-row conveyors. The vertically movable transfer conveyor carries a hydraulically operated motor and drive shaft which provides driving power to each of the cage row conveyors during the period of time when the vertically movable conveyor is in the proper position to receive eggs from the respective driven cage-row conveyors. The drive motor drives each drive shaft of the cage-row conveyors through coacting mechanical means, e.g., gears or rubber rollers, in a manner which couples and de-couples the drive system automatically as the vertically movable conveyor is moved up and down along the egg delivery ends of the cage-row conveyors on each tier. Only when the vertically movable conveyor is at a position to receive eggs from a tier of cage-row conveyors, does the coacting mechanical drive means couple the row conveyor drive shaft and the pertinent cage-row conveyors to deliver eggs to the vertically movable conveyor.

Accordingly, a single, vertically movable, horizontally extended transfer conveyor may service a plurality of tiers, while, at the same time, causing the egg collecting cage-row conveyor to deliver eggs to the vertically movable conveyor only during the period of time when the vertically movable conveyor is in an egg-receiving position with respect to each tier of cage-row conveyors.

BRIEF DESCRIPTION OF THE DRAWINGS

FIG. 1 is a front elevational view of the automated, tiered egg collecting system of the present invention showing the vertically movable, horizontally extended conveyor in association with two, three-tiered confinement cage batteries;

FIG. 2 is a top plan view of the vertically movable conveyor in egg-receiving relation with one tier of cage-row conveyors;

FIG. 3 is a perspective view of the invention, particularly showing the relationship between the vertically movable conveyor and the cage-row conveyors;

FIG. 4 is a schematic diagram of an electrical control circuit for use with a preferred embodiment of the invention;

FIG. 5 is a perspective view of a portion of a telescoping conveyor section; and FIG. 6 is a cross-sectional view taken along line 6—6 in FIG. 2, particularly showing the coacting drive system of the invention.

DETAILED DESCRIPTION OF THE PREFERRED EMBODIMENT

The automated, tiered egg-collecting system of the present invention, indicated generally in a front elevational view in FIG. 1 at 10, shows two batteries of tiered confinement cages, generally designated at 12, each providing three tiers of cage rows, each tier in each battery having two rows of cages. Cages 14, in the top tier of cage rows, cages 16, in the middle tier of cage rows, and cages 18 in the bottom tier of cage rows have an inclined bottom which causes eggs layed within the cages to roll by gravity onto a respective conveyor for the row.

Cage-row conveyors 20, 22, and 24 are provided in association with the cages 14, 16 and 18, respectively.

The cage row conveyors 20, 22, and 24 are driven by cage-row conveyor shafts 26, 28 and 30, respectively. Carried on the cage-row conveyor shafts 26, 28 and 30 are gears 32, 34, and 36, respectively. The cage-row conveyor shafts 26, 28, and 30 are retained through bushings or other suitable bearings by frame members 38 and 40 on each battery of cages. Frame member 38 presents in cross-section a generally U-shaped guide channel 39 (see FIG. 2) opening toward the exterior of the cage battery 12. The frame members 40 on each of the batteries shown in FIG. 1, provide frame cutouts for the gears 32, 34, and 36 and a guide channel 41 (see FIG. 2) of similar shape, but opposite orientation to guide channel 39.

A vertically movable horizontal extending transport conveyor 42 is disposed transversely of the row conveyors 20, 22, and 24, and is capable of being moved up and down adjacent the ends of the cage batteries 12. The vertically movable transport conveyor 42 is coupled with a stationary horizontal egg conveyor unit 44 through a telescoping conveyor section 46. The telescoping conveyor section 46 permits movement of the vertically movable transport conveyor 42 while maintaining conveying relationship with the egg conveyor unit 44. Four flexible cables 48 are attached to the transport conveyor 42 in a manner such that, in combination with pulleys 50 and a winch 52, the transport conveyor, in a horizontal position, may be raised and lowered to any desired level. As shown in FIG. 1, cables 48 are joined with one another at a coupling point 54 in a single cable member 55 which is pulled and released by the winch 52.

As shown in FIG. 2, the vertically movable transport conveyor 42 utilizes spaced egg-carrying links 56. The links 56 are relatively arranged so that eggs will be prevented from rolling along the telescoping conveyor section 46 (see FIG. 1) when the transport conveyor 42 is in an egg-receiving position with respect to the cage-row conveyors 20 on the third tier of the cage batteries 12, or in any other intermediate inclined position of the telescoping conveyor section 46. Such spaced egg-carrying links are shown, for example, in Capelleveen U.S. Pat. No. 4,244,464. The conveyor links on the vertically movable transport conveyor 42 may be combined in a single endless loop with the links on the telescoping conveyor section 46, or the transport conveyor 42 may use a separate endless loop.

A hydraulically powered drive motor 58 (FIG. 2) is carried by the transport conveyor 42 on a mounting bracket 60. Of course the drive motor 58 could also be a motor driven by electrical power. The drive motor 58 is coupled directly to a shaft 62 extended longitudinally of and carried along the side of the transport conveyor 42 by a bearing member 64 through which the shaft 62 extends. Other bearing members (not shown) similar to bearing member 64 may be used along the length of the vertically movable transport conveyor 42 to support extensions of the shaft 62. Mounting bracket 60 also carries guide rollers 61 which are retained within the guide channel 39 of the frame member 38. In like fashion, bearing member 64 carries guide rollers 65, which are retained within the guide channel 41 of the frame member 40. The guide rollers 61 and 65, in combination with the channels 39 and 41, respectively, maintain a suitable guiding relationship between the vertically movable conveyor 42 and the cage battery 12.

Carried in a fixed relation on the shaft 62 is a drive gear 66 which coacts with the cage-row conveyor drive gears 32, 34, and 36 (see FIG. 1) such that the drive motor 58 provides selective driving force for the conveyors 20, 22, and 24. Egg deflecting plates 68 mounted on the conveyor 42 act to direct eggs from the cage-row conveyors 20, 22, and 24, onto the vertically movable transport conveyor 42. Of course, any suitable egg-guiding means could be substituted for the egg deflecting plates 68, and similar egg guiding means could also be used to retain eggs on the conveyors 20, 22, and 24, as the eggs are conveyed along the cage rows. Such egg guiding means is illustrated at 70 in FIG. 3.

As shown in FIG. 3, the cable 48, which is pulled by the winch 52 (see FIG. 1) causes the vertically movable transport conveyor 42 to be displaced upward and downward adjacent the frame members 38 and 40 and transversely of the ends of the cage-row conveyors 20, 22, and 24. During the time when the vertically movable transport conveyor 42 is in egg-receiving relation with the row conveyor, drive gear 66 (see FIG. 6) is in a coacting drive relation with one of the driven gears 32, 34, or 36, thereby causing the respective cage-row conveyors 20, 22, or 24, to deliver eggs to the vertically movable transport conveyor 42.

Conventional momentary contact switches 72, as illustrated in FIG. 3, may be used to sense when the vertically movable conveyor 42 is in a proper egg-receiving position relative to a tier of cage-row conveyors 20, 22, or 24. The switches 72 provide an indication, which either manually or automatically, results in temporarily halting operation of the winch 52 at each position. A wide variety of conventionally known automatic or manual switching systems may be used to start, stop or reverse, winch 52 at each tier.

One such automatic circuit is illustrated schematically in FIG. 4. A motor switching circuit, generally designated 69, is connected between a power supply 71 and a winch motor 73. Normally closed switches 72 in switching circuit 69 are connected in series and are situated (see FIG. 3) at positions in which one switch 72 opens when the vertically movable transport conveyor 42 is in a proper egg receiving position relative to the tier with which the open switch is associated. At that time, the series circuit of switches 72, for tiers 1, 2, and 3, is broken, thereby halting the winch motor 73.

After a suitable period of time, e.g., three to ten minutes, a normally open period timer 75 momentarily closes the motor switching circuit 69, thereby causing the winch motor 73 to operate and the vertically movable transport conveyor 42 to move. Movement of the vertically movable transport conveyor 42 in turn causes the previously open switch 72 to close. The normally open period timer 75 then opens, and the vertically movable conveyor 42 proceeds to move to the next tier until the normally closed switch 72 of the next tier opens, thereby stopping the winch motor 73 at that tier and initiating the above-described cycle again.

At the top tier and at the bottom tier of cage rows, one normally open reversing switch 77 closes, causing a motor reversing circuit 79 to reverse the direction of the winch motor 73. The motor reversing circuit 79 may be a latching double throw, double pole relay, or other conventional reversing mechanism.

The resulting action of the circuit shown in FIG. 4 is to cause the vertically movable transport conveyor 42 to move from tier to tier and to halt at each tier, during its travel up and down, for a period of time determined by normally open period timer 75. A semi-automatic system could be utilized by replacing the normally open period timer 75 with a normally open manually operated switch or push button 81 (shown in broken lines in FIG. 4).

It should be noted, however, that no auxiliary electrical or mechanical systems are required to cause the proper row conveyors 20, 22, or 24 to operate at the proper times. In the illustrated preferred embodiment of the invention, the drive motor 58 is operated continuously, and physical movement alone of the vertically movable transport conveyor 42 produces, without any additional control mechanism, a coupling relationship between the drive gear 66 and a driven gear 32, 34, or 36, at the time the vertically movable conveyor 42 is in an egg-receiving relation with the associated tier of cage-row conveyors 20, 22, or 24, respectively (see FIG. 6). The period of time during which the vertically movable conveyor 42 is at each tier of cages to receive eggs from that tier of cage-row conveyors may be determined by the volume of eggs being produced, but it is contemplated that the time period would be sufficient to permit delivery of all the eggs on the respective cage-row conveyor.

As shown in FIG. 5, the telescoping conveyor section 46 provides a variable length conveyor link between the vertically movable transport conveyor 42 and the stationary conveyor unit 44 (FIG. 1). A stabilizing rail 79, together with retaining guide rollers 80, provides lateral stability to the telescoping conveyor section 46 while at the same time permitting extension and contraction of the conveyor section. In order to accommodate the variable distance between the vertically movable transport conveyor 42 and the stationary conveyor 44 when the vertically movable transport conveyor 42 is in a variety of vertical positions, the telescoping conveyor section 46 carries slotted frame portions 74 and conveyor link slack rollers 76 for purposes of accommodating varied lengths of slack conveyor links at varying height levels of the vertically movable transport conveyor 42. A spring 78 maintains proper tension in the conveyor link slack. Of course, the slack compensating mechanism could be carried at any point along the length of the continuous loop conveyors 42 and 46, in the event such a continuous loop is used.

It should be clear from the foregoing description of the preferred embodiment that other mechanical or electrical means could be employed in accomplishing the broad purposes of the invention. Such modification may include among others, a wide variety of position or cable length sensing mechanisms for determining the position of the vertically movable transport conveyor 42, as well as the use of a variety of coacting coupling means between the drive motor 58 and the cage-row conveyors 20, 22, and 24. It should be understood this description is intended to illustrate but not to limit the scope of the invention as defined in the following claims.

I claim:

1. An automated, tiered egg collecting system having associated tiered confinement cage rows for poultry and row conveyors extended longitudinally along each cage row for delivering eggs from a cage row to an egg delivery end thereof, comprising:

(a) vertically movable horizontally extended conveyor means for selectively receiving eggs from a row conveyor;
    (b) vertical displacement means for moving said horizontally extended conveyor means to one of a plurality of selected vertical egg-receiving positions, wherein said horizontally extended conveyor means is in an egg-receiving relation with the delivery end of a selected row conveyor; and
    (c) power means carried on said horizontally extended conveyor means for driving a row conveyor at the selected vertical egg-receiving position.

2. An automated, tiered egg collecting system as defined in claim 1, wherein said power means comprises:

(a) at least one drive shaft carried on said horizontally extended conveyor means;
    (b) multiple row conveyor shafts, providing egg conveying displacement to each respective row conveyor; and
    (c) coacting rotational coupling means carried on said drive shaft and on each said row conveyor shaft for driving each row conveyor at a selected vertical position in which said horizontally extended conveyor means is in an egg-receiving relation with the selected row conveyor.

3. An automated, tiered egg collecting system as defined in claim 2, wherein said coacting rotational coupling means comprises a drive gear on said drive shaft and a driven gear on each of said row conveyor shafts.

4. An automated, tiered egg collecting system as defined in claim 2, wherein said coacting rotational coupling means comprises a drive roller on said drive shaft and a driven roller on each of said row conveyor shafts.

5. In an egg conveying system, including a vertical tier of horizontally extended rows of poultry cages wherein each of said rows has an associated cage row egg conveyor having a discharge end, (a) a conveyor assembly for delivering eggs from said cage row egg conveyors to an egg collecting station including a horizontal egg receiving section,
    (b) an upright frame structure adjacent the discharge ends of said cage row egg conveyors,
    (c) means on said frame structure movably supporting said egg receiving section for vertical movement to an egg receiving position relative to the discharge end of each cage row egg conveyor,
    (d) power means on said egg receiving section,
    (e) coacting means on said egg receiving section and on each of said cage row egg conveyors for releasably engaging the power means in a driving relation with a cage row egg conveyor only when the egg receiving section is in an egg receiving position therefor, whereby each cage row egg conveyor is independently operated to transfer eggs therefrom to said egg receiving section as a function of the vertical position of the egg receiving section with respect to the cage row egg conveyor, and
    (f) means for selectively moving said egg receiving section to an egg receiving position therefor.

6. A method for collecting eggs from a series of vertically tiered confinement cage rows each tier of which has an associated egg-receiving row conveyor with a delivery end, and a horizontally extended vertically movable conveyor means for receiving eggs from said row conveyor means comprising the steps of:
(a) providing a power means on said horizontally extended conveyor means,
(b) moving said horizontally extended conveyor means vertically to one of a plurality of selected positions in which said horizontally extended conveyor is in egg-receiving relation with at least one of said row conveyor means; and
(c) driving each said row conveyor means through said power means only during the period of time in which said horizontally extended conveyor means is in an egg-receiving relation therewith.

* * * * *